United States Patent [19]
Yang et al.

[11] Patent Number: 6,013,722
[45] Date of Patent: Jan. 11, 2000

[54] NON-WHITENING EMULSION PRESSURE SENSITIVE ADHESIVES

[75] Inventors: Jie Yang; Ying-Yuh Lu, both of Woodbury; James E. Kropp, Maplewood, all of Minn.

[73] Assignee: 3M Innovative Properties Company, St. Paul, Minn.

[21] Appl. No.: 09/013,741

[22] Filed: Jan. 27, 1998

[51] Int. Cl.$^7$ ............ C08L 31/02; C08F 220/26
[52] U.S. Cl. ............ 524/558; 526/320; 526/931; 524/833
[58] Field of Search ............ 524/558, 833; 526/320

[56] References Cited

U.S. PATENT DOCUMENTS

| | | | |
|---|---|---|---|
| 3,632,412 | 1/1972 | Blance et al. | 526/320 |
| 3,763,117 | 10/1973 | McKenna, Jr. et al. . | |
| 4,102,253 | 7/1978 | Gannicott | 93/93 C |
| 4,653,666 | 3/1987 | Mertens | 221/45 |
| 4,781,306 | 11/1988 | Smith | 221/33 |
| 4,828,243 | 5/1989 | Ebihara | 271/3.1 |
| 4,835,947 | 6/1989 | Langen et al. | 53/542 |
| 4,994,538 | 2/1991 | Lee . | |
| 5,011,132 | 4/1991 | Guttinger et al. | 271/315 |
| 5,080,255 | 1/1992 | Windorski | 221/45 |
| 5,234,736 | 8/1993 | Lee . | |
| 5,286,843 | 2/1994 | Wood . | |
| 5,302,629 | 4/1994 | Berejka | 524/558 |
| 5,326,644 | 7/1994 | Scholz et al. . | |
| 5,397,117 | 3/1995 | Mertens | 221/34 |
| 5,420,195 | 5/1995 | Mayer et al. . | |
| 5,472,240 | 12/1995 | Davies | 283/116 |
| 5,604,035 | 2/1997 | Kojima et al. | 526/320 |

FOREIGN PATENT DOCUMENTS

| | | |
|---|---|---|
| 0080707 | 6/1983 | European Pat. Off. . |
| 0 793 972 A2 | 10/1997 | European Pat. Off. . |
| 8253749 | 1/1997 | Japan . |
| 1 250 056 | 3/1969 | United Kingdom . |
| WO 91/17201 | 11/1991 | WIPO . |
| 94/14614 | 7/1994 | WIPO . |
| WO 97/11996 | 4/1997 | WIPO . |

OTHER PUBLICATIONS

International Search Report PCT/US96/18044.
US Patent Application No. 08/285882 filed Aug. 4, 1994.

*Primary Examiner*—Tae Yoon
*Attorney, Agent, or Firm*—Carolyn V. Peters

[57] ABSTRACT

Water resistant, low haze acrylic emulsion pressure sensitive adhesive compositions for use in decorative, light management or optical articles are disclosed. These emulsion pressure sensitive adhesives comprise (a) 50–90% by weight n-butyl acrylate, and (b) 10–50% by weight 2-hydroxy ethyl acrylate, or 2-hydroxy ethyl methacrylate, hydroxy propyl acrylate monomer, or mixtures thereof. These emulsion pressure sensitive adhesives can be used in wet lamination processes, and exhibit less than 2% increase in haze, less than 2% increase in opacity and greater than 95% transmittance after the wet lamination process.

11 Claims, No Drawings

NON-WHITENING EMULSION PRESSURE SENSITIVE ADHESIVES

TECHNICAL FIELD

This invention relates to pressure sensitive adhesives and more particularly to water resistant, low haze acrylic-based emulsion (latex) pressure sensitive adhesives for use in decorative, light management or optical articles.

BACKGROUND OF THE INVENTION

Due to the use of surfactants and other water soluble materials, water-based emulsion polymers (i.e., latices) are known to be water-sensitive. Emulsion polymers typically become hazy under high humidity or wet conditions, and hazy emulsions have been described as "cloudy", "milky" and "white" in the literature. To prevent or reduce haze in emulsion polymers, many approaches have been employed and reported in literature. Such approaches have involved using polymerizable surfactants, surfactant-free emulsion polymerization methods, alternative monomer and initiator selection, pH control of emulsion system, etc.

One use for such emulsion polymers, particularly acrylic-based emulsion pressure sensitive adhesives, is as a bonding or joining layer in laminated or layered constructions. Emulsion adhesive-coated films can be laminated to another surface either under dry conditions, generally referred to as "dry lamination", or under wet conditions using, for example, water. This latter laminating process is generally referred to as "wet lamination." Dry lamination has the advantage of being fast (i.e., takes the least amount of time), but if the acrylic emulsion adhesive is water-sensitive, there can be problems with haze once the finished laminate is exposed to moisture or humidity. Dry laminating methods also are susceptible to entrapment of air bubbles between the adhesive layer and bonded surface. Thus, to obtain optically clear and bubble free lamination in the dry lamination process, high pressure and/or high temperature processing is typically required, such as treating the laminates in an autoclave. Such additional processing often requires specialized and expensive equipment and, when considered for larger articles, is impossible or impractical.

An alternative method for obtaining bubble free lamination is to use a wet lamination process. Such processes are typically used for window glass film laminations. These procedures include spraying water onto window glass surface, then laminating the adhesive coated film onto the wet glass surface. In addition to the fact that wet lamination generally provides bubble free lamination, the film remains repositionable to allow proper placement of the film on the glass surface. Once dry, the adhesive loses its repositionable character and the bond to the glass surface builds to the required strength.

Unfortunately, most acrylic emulsion pressure sensitive adhesives (PSAs) whiten when exposed to water. These emulsion PSAs will regain their original clarity following the wet lamination process. However, the milky white color will return under high temperature and high humidity conditions. This whitening is undesirable in some adhesive applications and is unacceptable in decorative, light management or optical articles the require high clarity under a variety of conditions in the finished product. Thus, an acceptable emulsion PSA useful in the above mentioned applications should possess non-whitening and low haze properties during both the wet lamination process and when exposed to high temperature and high humidity environments.

Solvent-based pressure sensitive adhesives are typically water tolerant, that is, generally water insensitive and can exhibit non-whitening performance under such conditions. Although effective in reducing whitening of adhesives, in many situations and locations the use of solvents is undesirable and/or not permitted. In the adhesives industry, major efforts have been undertaken to remove solvents from formulations due to environmental concerns and regulatory requirements.

Several emulsion acrylic adhesives have been described as water-resistant. However, typically they only exhibit such behavior for only a short period of time. Thus over time, the adhesives become hazy and take on a white or yellowish hue as a result of high heat and humidity conditions. See for examples, U.S. Pat. Nos. 5,420,195, 5,286,843, 4,994,538 and 5,234,736 and PCT Publication No. WO 91/17201.

Thus, what is needed is a water-insensitive, optically clear emulsion acrylic based pressure sensitive adhesive.

SUMMARY OF THE INVENTION

Briefly, in one aspect of the present invention, a water-resistant emulsion pressure sensitive adhesive is provided comprising (a) 50–90% by weight, preferably 70–90% by weight n-butyl acrylate, (b) 10–50%, preferably 10–30% by weight 2-hydroxy ethyl acrylate, or 2-hydroxy ethyl methacrylate, hydroxy propyl acrylate monomer, or mixtures thereof, (c) optionally, co-polymerizable monomers and (d) optionally, a multifunctional cross-linking agent that exhibits less than 2% increase in haze, less than 2% increase in opacity and greater than approximately 95% transmittance in the visible spectrum ranging from 380 to 720 nm after wet lamination process.

In another aspect, the optional co-polymerizable monomers include (i) 0–50% by weight alkylacrylate monomer or (ii) 0–5% by weight polar monomers or (iii) 0–50% by weight ethylenically unsaturated free radically polymerizable monomers and mixtures thereof. Alkylacrylate monomers may include methyl methacrylate, isobornyl acrylate, ethyl acrylate, methyl acrylate, isooctylacrylate, 2-ethyl hexyl acrylate and mixtures thereof and the preferred range of a co-polymerizable alkylacrylate is in the range of 0–30%. Useful polar monomers include acrylic acid, methacrylic acid, itaconic acid, N-vinyl pyrrolidone, N-vinyl caprolactam, substituted (meth)acrylamides, such as N,N,-dimethyl acrylamides and N-octylacrylamide, dimethylaminoethyl methacrylate, acrylonitrile, 2-carboxyethyl acrylate, maleic anhydride, and mixtures thereof. Useful ethylenically unsaturated free radically polymerizable monomers include styrene and $C_1$–$C_4$ vinyl esters such as vinyl acetate and vinyl propionate and mixtures thereof and the preferred range is in the range of 0–30% by weight.

Advantageously, the pressure sensitive adhesives of the present invention are solvent-free and environmentally friendly, optically clear, exhibit low haze under wet lamination processes, and can be formulated to have a range of adhesive performance when adhered to glass, plastic and other surfaces.

The pressure sensitive adhesives of the present invention are optically clear, water resistant and stable under high temperature and humidity conditions. Typically, the adhesives of the present invention have an increase in haze that is less than 2% upon wet lamination, while conventional adhesives used for the same purposes have haze increases above 2% and as high as 20%. In other words, in a laminated article the adhesives of the present invention contribute less than 2% haze and less than 2% opacity to the total % haze and % opacity of the construction.

Furthermore, water-insensitive or water-resistant emulsion adhesives could be useful in decorative, light management and optical articles that require high clarity under a variety of conditions. Adhesives used in such articles must conform to strict optical requirements and be resistant to the effects of high humidity and heat.

As used in this application "% by weight" refers to the percentage of a components present wherein the sum of all components equal 100%.

DESCRIPTION OF THE PREFERRED EMBODIMENT(S)

A water-resistant emulsion pressure sensitive adhesive is provided comprising (a) 50–90% by weight, preferably 70–90% by weight n-butyl acrylate, (b) 10–50%, preferably 10–30% by weight 2-hydroxy ethyl acrylate, or 2-hydroxy ethyl methacrylate, hydroxy propyl acrylate monomer, or mixtures thereof, (c) optionally, co-polymerizable monomers and (d) optionally, a multifunctional cross-linking agent and exhibit less than 2% increase in haze, less than 2% increase in opacity and greater than approximately 95% transmittance in the visible spectrum ranging from 380 to 720 nm.

The optional co-polymerizable monomers include (i) 0–50% by weight alkylacrylate monomer or (ii) 0–5% by weight polar monomers or (iii) 0–50% by weight ethylenically unsaturated free radically polymerizable monomers. Alkylacrylate monomers may include methyl methacrylate, isobornyl acrylate, ethyl acrylate, methyl acrylate, isooctylacrylate, 2-ethyl hexyl acrylate and mixtures thereof and the preferred range of a co-polymerizable alkylacrylate is in the range of 0–30% by weight. Useful polar monomers include acrylic acid, methacrylic acid, itaconic acid, N-vinyl pyrrolidone, N-vinyl caprolactam, substituted (meth) acrylamides, such as N,N,-dimethyl acrylamides and N-octylacrylamide, dimethylaminoethyl methacrylate, acrylonitrile, 2-carboxyethyl acrylate, maleic anhydride, and mixtures thereof. Useful ethylenically unsaturated free radically polymerizable monomers include styrene and $C_1$–$C_4$ vinyl esters such as vinyl acetate and vinyl propionate and mixtures thereof and the preferred range is in the range of 0–30% by weight.

Multifunctional Crosslinking Agents

Multifunctional crosslinking agents, if added, can be used in the emulsion formulation to control the physical and optical properties of the final polymer. The crosslinking agent can be copolymerizable with the monomeric components of the emulsion mixture or may by added to the polymerized latex product. Examples of copolymerizable crosslinking agents include but are not limited to those selected from the group consisting of divinylbenzene; alkyl diacrylates such as those selected from the group consisting of 1,2-ethylene glycol diacrylate, 1,4-butanediol diacrylate, 1,6-hexanediol diacrylate, 1,8-octanediol diacrylate; and 1,12-dodecanediol diacrylate, alkyl triacrylates and tetracrylates such as trimethylol propane triacrylate and pentaerythritol tetraacrylate, monoethylenically unsaturated aromatic ketones such as 4-acryloxybenzophenone, and mixtures thereof. The preferred copolymerizable crosslinking agent is 1,6-hexanediol diacrylate.

Post-additive crosslinking agents can also be used. Examples of post-additive crosslinking agents include but are not limited to include multifunctional aziridine amides such as 1,1'-(1,3-phenylenedicarbonyl)bis[2-methyl aziridine], 2,2,4-trimethyladipoyl bis [2-ethyl aziridine], 1, 1'-azelaoyl bis [2-methyl aziridine], and 2,4,6-tris(2-ethyl-1-aziridinyl)-1,3,5 triazine; and metal ion crosslinkers such as copper, zinc, zirconium and chromium. Preferred metal ion crosslinkers are chelated esters of ortho-titanic acid sold under the tradename TYZOR and commercially available from the E.I. du Pont de Numours Co. An especially preferred TYZOR is TYZOR AA, which is titanium acetyl acetonate.

Crosslinking agents, when used, comprise about 0 to about 10 parts by weight, typically about 0.1 to about 2 percent by weight of the copolymerizable emulsion formulation based on 100 parts by weight of the n-butyl acrylate, hydroxyalkyl (meth)acrylate monomer, and optional co-polymerizable monomer components.

Initiators

Water-soluble and oil-soluble initiators useful in preparing the water-resistant emulsion pressure-sensitive adhesives of the present invention are initiators that, on exposure to heat, generate free-radicals which initiate (co) polymerization of the n-butyl acrylate, hydroxyalkyl (meth) acrylate monomer, and optional comonomer and crosslinking agent components. Water soluble initiators are preferred. Suitable water-soluble initiators include but are not limited to those selected from the group consisting of potassium persulfate, ammonium persulfate, sodium persulfate, and mixtures thereof; oxidation-reduction initiators such as the reaction product of the above-mentioned persulfates and reducing agents such as those selected from the group consisting of sodium metabisulfite and sodium bisulfite; and 4,4'-azobis(4-cyanopentanoic acid) and its soluble salts (e.g., sodium, potassium). The preferred water-soluble initiator is potassium persulfate. Suitable oil-soluble initiators include but are not limited to those selected from the group consisting of azo compounds such as VAZO 64 (2,2'-azobis (isobutyronitrile) and VAZO 52 (2,2'-azobis(2,4-dimethylpentanenitrile)), both available from E.I. du Pont de Numours Co., peroxides such as benzoyl peroxide and lauroyl peroxide, and mixtures thereof. The preferred oil-soluble thermal initiator is (2,2'-azobis(isobutyronitrile)). When used, initiators may comprise from about 0.05 to about 1 part by weight, preferably about 0.1 to about 0.5 part by weight based on 100 parts by weight of co-polymerizable components in the pressure sensitive adhesive formulation.

Chain Transfer Agents

The copolymerizable emulsion mixture may optionally further comprise a chain transfer agent. Examples of useful chain transfer agents include but are not limited to those selected from the group consisting of carbon tetrabromide, alcohols, mercaptans, and mixtures thereof. When present, the preferred chain transfer agent is isooctylthioglycolate and carbon tetrabromide. The emulsion mixture may further comprise up to about 0.5 parts by weight of a chain transfer agent, typically about 0.01 weight percent to about 0.5 parts by weight, if used, preferably about 0.05 parts by weight to about 0.2 parts by weight, based upon 100 parts by weight of the total copolymerizable emulsion mixture.

Surfactants

Polymerization via emulsion techniques requires the presence of an emulsifier (which may also be called an emulsifying agent or a surfactant). Useful emulsifiers for the present invention include those selected from the group consisting of anionic surfactants, nonionic surfactants, and mixtures thereof.

Useful anionic surfactants include but are not limited to those whose molecular structure includes at least one hydrophobic moiety selected from the group consisting of from about $C_6$- to about $C_{12}$-alkyl, alkylaryl, and/or alkenyl groups as well as at least one anionic group selected from the group consisting of sulfate, sulfonate, phosphate, polyoxyethylene sulfate, polyoxyethylene sulfonate, polyoxyethylene phosphate, and the like, and the salts of such anionic groups, wherein said salts are selected from the group consisting of alkali metal salts, ammonium salts, tertiary amino salts, and the like. Representative commercial examples of useful anionic surfactants include sodium lauryl sulfate, available from Stepan Chemical Co. as POLYSTEP B-3; sodium lauryl ether sulfate, available from Stepan Chemical Co. as POLYSTEP B-12; and sodium dodecyl benzene sulfonate, available from Rhone-Poulenc as SIPONATE DS-10.

Useful nonionic surfactants include but are not limited to those whose molecular structure comprises a condensation product of an organic aliphatic or alkyl aromatic hydrophobic moiety with a hydrophilic alkylene oxide such as ethylene oxide. The HLB (Hydrophilic-Lipophilic Balance) of useful nonionic surfactants is about 10 or greater, preferably from about 10 to about 20. The HLB of a surfactant is an expression of the balance of the size and strength of the hydrophilic (water-loving or polar) groups and the lipophilic (oil-loving or non-polar) groups of the surfactant. Commercial examples of nonionic surfactants useful in the present invention include but are not limited to nonylphenoxy or octylphenoxy poly(ethyleneoxy) ethanols available from Rhone-Poulenc as the IGEPAL CA or CO series, respectively; $C_{11}$–$C_{15}$ secondary-alcohol ethoxylates available from Union Carbide as the TERGITOL 15-S series; and polyoxyethylene sorbitan fatty acid esters available from ICI Chemicals as the TWEEN series of surfactants.

Preferably, the emulsion polymerization of this invention is carried out in the presence of anionic surfactant(s). A useful range of emulsifier concentration is from about 0.5 to about 8 weight percent, preferably from about 1 to about 5 weight percent, based on the total weight of all monomers of the emulsion pressure sensitive adhesive."

The emulsion pressure sensitive adhesives of the invention may also contain one or more conventional additives. Preferred additives include plasticizers, dyes, fillers, antioxidants, and UV stabilizers. Such additives can be used if they do not affect the superior optical properties of the emulsion pressure sensitive adhesives.

Emulsion Polymerization Process

The water-resistant emulsion pressure sensitive adhesives of the present invention are prepared by a semi-continuous emulsion polymerization process. In the process, a flask is charged with a seed monomer mixture comprising deionized (DI) water, surfactant, n-butyl acrylate, hydroxyalkyl (meth) acrylate (b) monomers, and optional co-polymerizable monomers, plus any optional multifunctional crosslinking agents, chain transfer agents, pH modifiers or other additives. The mixture is stirred and heated under an inert atmosphere such as a nitrogen blanket. When the mixture has reached induction temperature, typically about 50 to about 70° C., the first initiator is added to initiate the polymerization and the reaction is allowed to exotherm. After the seed reaction is completed, the batch temperature is then raised to the feed reaction temperature, about 70 to about 85° C. At the feed reaction temperature, the monomer pre-emulsion comprising DI water, surfactant, n-butyl acrylate, hydroxyalkyl (meth)acrylate (b) monomers, and optional co-polymerizable monomers, plus any optional multifunctional crosslinking agents, chain transfer agents or other additives is added to the stirred flask over a period of time, typically 2 to 4 hours, while the temperature is maintained. At end of the feed reaction, the second initiator charge, if used, is added to the reaction to further reduce residual monomers in the latex. After additional hour of heating, the mixture is cooled to room temperature (about 23° C.) and the latex is collected for evaluation.

The pH of the latex prepared using this method is typically about 2 to about 3. The acidity of the latex can be modified following latex formation using a pH modifier such as a basic solution (e.g., solutions of sodium hydroxide, ammonium hydroxide and the like) or buffer solutions (e.g., sodium bicarbonate and the like), to less acidic levels. Preferably, the pH is 7 or less, more preferably, the pH is in the range of 2 to 6.

Substrates and Coating Methods

The water-resistant emulsion pressure sensitive adhesives of the present invention are easily coated upon suitable flexible backing materials by conventional coating techniques to produce adhesive coated sheet materials. The flexible backing materials may be any materials conventionally utilized as a tape backing, optical film or any other flexible material. Typical examples of flexible backing materials employed as conventional tape backing that may be useful for the adhesive compositions include those made of paper, plastic films such as polypropylene, polyethylene, polyurethane, polyvinyl chloride, polyester (e.g., polyethylene terephthalate), cellulose acetate, and ethyl cellulose.

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metallized polymer films, or ceramic sheet materials may take the form of any article conventionally known to be utilized with pressure sensitive adhesive compositions such as labels, tapes, signs, covers, marking indicia, and the like.

The emulsion pressure sensitive adhesives of the present invention may be coated by any variety of conventional coating techniques such as roll coating, spray coating, knife coating, die coating and the like.

Lamination Processes

While the water-resistant emulsion adhesives of the present invention are well suited for use in wet lamination applications where water-resistant is highly desired, the adhesive of the present invention performs well in dry lamination applications, wherein the resultant lamination is subjected to high heat and humidity conditions.

To begin, pressure sensitive adhesive is coated onto backings with the desired coating thickness and then dried before lamination. Then, water is sprayed onto glass or other substrate, sometimes along with a small amount of surfactant to lower the water's surface tension, to obtain a thin water layer on the substrate surface. The film is then positioned properly on the substrate, and most of the excess of water is squeezed out to yield a substrate/PSA/film laminate. The remaining water in the laminate will be evaporated in a few days, depending on the materials used in the laminate.

Dry lamination

For dry lamination, a PSA is coated onto films (backings) with the desired coating thickness, and then dried before lamination. Such PSA coated film is then adhered onto substrate surface with pressure and/or high temperature to bond the film onto the substrate surface.

In addition to the decorative, light management and optical applications described above, the water-resistant emulsion pressure sensitive adhesives can be used in a variety of traditional pressure sensitive adhesive articles, such as tapes, labels, decals, transfer tapes and other articles.

This invention is further illustrated by the following examples that are not intended to limit the scope of the invention. In the examples, all parts, ratios and percentages are by weight unless otherwise indicated. The following test methods were used to evaluate and characterize the emulsion PSAs produced in the examples. All materials are commercially available, for example from Aldrich Chemicals, unless otherwise indicated or described.

| Glossary | |
|---|---|
| AA | acrylic acid |
| BA | n-butyl acrylate |
| HDDA | 1,6-hexanediol diacrylate |
| HEA | 2-hydroxyethyl acrylate |
| HEMA | 2-hydroxyethyl methacrylate |
| HPA | hydroxypropyl acrylate |
| IBOA | isobornyl acrylate |
| IOA | isooctyl acrylate |
| MMA | methyl methacrylate |
| TRANS | transmittance |

Test Methods

Luminous Transmittance and Haze

The luminous transmittance and haze of acrylic latex pressure sensitive adhesive samples were measured according to American Society for Testing and Measurement (ASTM) Test Method D 1003-95 ("Standard Test for Haze and Luminous Transmittance of Transparent Plastic") using a TCS Plus Spectrophotometer (BYK-Gardner Inc., Silver Springs, Md.).

Samples were prepared by coating the acrylic latex pressure sensitive adhesive onto a clear primed polyester film having a thickness of 50 microns. The coated sample was oven dried at 65° C. for 15 minutes to yield a dried pressure sensitive adhesive coating thickness of 25 microns. The dried coated film sample was conditioned for at least 24 hours (rather than the minimum 40 hours specified in ASTM Test Method D 1003-95) at 22° C. and 50% relative humidity. A small piece of this adhesive coated film (ca. 7.5cm×5.0 cm) was laminated onto a glass microscope slide (75×50×1 mm, Fisherbrand, precleaned, Fisher Scientific, catalog No. 12-550C). This film/adhesive/glass laminate was used for calibration in luminous transmittance: i.e., the luminous transmittance of this sample was defined as 100% when compared to the "wet" laminated samples described below. For haze measurements, the values for the dry laminated sample served as initial value against which the change in these properties of the corresponding "wet" laminated samples were observed.

From the same adhesive coated film, a "wet" laminated sample was prepared by wetting the surface of the glass microscope slide with de-ionized water and adhering the adhesive coated film to the wet glass surface of the microscope slide. Excess water was removed from the wet laminated samples, and luminous transmittance and haze measurements were made at the intervals specified in the following examples. Luminous transmittance values were calculated as percentage of transmittance retained in the wet laminated samples as compared to the dry laminated control, while haze for the wet laminated samples were recorded as the absolute percentage change in these optical properties with respect to the dry laminated control. Values considered acceptable for each of these optical properties are as follows:

Luminous Transmittance—greater than 95% of "dry" laminated sample

Haze—less than 2% increase compared to "dry" laminated sample

Opacity Measurement

The same samples used for haze and luminous transmittance measurements were used for opacity meansurement. The BYK Gardner TCS Plus Spectrophotometer was used for opacity measurement, with the standard size reflectance port (25 mm) installed, and diffuse reflectance (specular excluded) was measured. An absolute increase of less than 2% in the opacity of the sample compared to the dry laminated control was considered an acceptable value.

EXAMPLES

The water-resistant emulsion pressure sensitive adhesives were prepared by a semi-continuous process in which monomer pre-emulsions were fed into seed solutions. In all cases, 10% of the monomers were used to make the seeds, and the rest of 90% monomers were used to feed into the seed solution to form the latex pressure sensitive adhesive product.

Examples 1–6 and Comparative Example C1

In Example 1, 43.52 grams of n-butyl acrylate (BA), 7.68 grams of 2-hydroxyethyl acrylate (HEA), 300 grams of DI water and 0.5 gram of RHODACAL DS-10 (sodium dodecyl benzene sulfonate surfactant commercially available from Rhone-Poulenc) were added to a 2000 ml reactor. This mixture was stirred under nitrogen and degassed 4 times. The temperature was raised to 60° C. and 1.29 grams of potassium persulfate initiator was added. The exothermic temperature reached 64° C. The reaction mixture was then heated to 70° C. and maintained at this temperature for 20 min. to complete the seed reaction. The reaction temperature was further increased to 80° C. At 80° C., a pre-emulsified monomer mixture was fed into the reactor at 5.3 grams/minute for 2 hours. This pre-emulsified mixture contained 391.68 grams of BA, 69.12 grams of HEA, 167 grams of DI water and 5.29 grams of RHODACAL DS-10. After the feeding of the monomer mixture, the reaction was continued at 80° C. for another 60 min. After cooling down to room temperature, the reaction mixture was filtered through cheesecloth to yield an acrylic emulsion pressure sensitive adhesive of 52% solids, pH=2.5.

Dry and wet laminated tape samples were prepared and tested for luminous transmission, haze and opacity using the test methods described above, with the values for the wet laminated samples recorded at the time intervals stated in Table 1.

Latex pressure sensitive adhesive Examples 2–6 were similarly prepared and tested, the only change being the ratios of butyl acrylate and hydroxyethyl acrylate used and slightly decrease in solids %. The amounts of these monomers and other emulsion components for each example can be found in Table 7. The luminous transmittance, haze and opacity test results for Examples 2–6 are set forth in Table 1.

Comparative Example C1, an emulsion polymerized poly (n-butyl acrylate) pressure sensitive adhesive, was also prepared and tested as described above. Results of these tests are set forth in Table 1.

TABLE 1

| Ex. | BA/HEA (wt. Ratio) | Trans. (1 hr.) | Haze (1 hr.) | Opacity (3 hrs.) | Haze (3 hrs.) | Opacity (24 hrs.) | Haze (24 hrs.) |
|---|---|---|---|---|---|---|---|
| 1 | 85/15 | 98.1% | 1.5% | 0.3% | 1.1% | 0.7% | 1.3% |
| 2 | 90/10 | 99.0% | 0.3% | 1.1% | 0.3% | 1.1% | 0.1% |
| 3 | 80/20 | | | | 1.2% | | |
| 4 | 75/25 | | | | 1.5% | | |
| 5 | 60/40 | 96.1% | 1.1% | 1.8% | 0.9% | 1.1% | 0.6% |
| 6 | 50/50 | 96.7% | 1.7% | 1.8% | 1.5% | 1.1% | 0.8% |
| C1 | 100/0 | | | | 21% | | |

The results of these examples demonstrate that a broad range of BA/HEA emulsion copolymers can be made, all of which exhibit excellent optical properties.

Examples 7–9

Examples 7–9 illustrate the use of alternative hydroxyalkyl (meth)acrylate monomers in the high transmittance, low haze emulsion pressure sensitive adhesive compositions. All of the adhesive compositions were prepared by the semi-continuous emulsion polymerization method described in Example 1 using the butyl acrylate and hydroxyalkyl acrylate monomer amounts as shown in Table 7 and tested for haze as described above. Examples 8 and 9 were also measured for luminous transmittance and opacity. The results of these tests are reported in Table 2.

TABLE 2

| Ex. | Composition (wt. Ratio) | Trans. (1 hr.) | Haze (1 hr.) | Opacity (1 hr.) | Trans. (3 hrs.) | Haze (3 hrs.) | Opacity (3 hrs.) |
|---|---|---|---|---|---|---|---|
| 7 | BA/HEMA (90/10) | 98.9% | 1.0% | 1.2% | | 0.4% | |
| 8 | BA/HEMA (80/20) | 99.1% | 0.1% | 0.1% | | 0.1% | |
| 9 | BA/HPA (80/20) | 99.0% | 0.2% | 0.2% | 99.3% | 0.0% | 0.0% |

Examples 10–14

Examples 10–14 illustrate the use of alkylacrylate comonomers (isooctyl acrylate (IOA), methyl methacrylate (MMA) and/or isobornyl acrylate (IBA)) and polar comonomers (acrylic acid (AA)) with the butyl acrylate and hydroxyalkyl monomers in the high transmittance, low haze acrylic latex pressure sensitive formulations of the present invention. All of the adhesive compositions were prepared by the semi-continuous emulsion polymerization method described in Example 1 using the monomer amounts listed in Table 7 and tested for luminous transmittance, haze and opacity as described above. The results of these tests are reported in Table 3.

TABLE 3

| Ex. | Composition (wt. Ratio) | Trans. (1 hr.) | Haze (1 hr.) | Opacity (1 hr.) | Trans. (3 hrs.) | Haze (3 hrs.) | Opacity (3 hrs.) | Trans. (24 hrs.) | Haze (24 hrs.) | Opacity (24 hrs.) |
|---|---|---|---|---|---|---|---|---|---|---|
| 10 | IOA/BA/HEMA (40/40/20) | 99.25% | 0.2% | 0.3% | | 0.2% | | | | |
| 11 | BA/HEA/MMA/AA (72/15/10/3) | 99.4%* | 0.1%* | 0.2%* | 99.5% | 0.1% | 0.2% | 99.7% | 0.1% | 0.0% |
| 12 | BA/HEA/MMA/AA (75/15/5/5) | 98.7%* | 0.5%* | 0.4%* | 98.8% | 0.4% | 0.3% | 98.6% | 0.7% | 0.4% |
| 13 | BA/HEA/MMA/IBA (65/15/10/10) | 98.6% | 1.8% | 1.6% | 99.0% | 1.6% | 1.4% | 99.7% | 1.2% | 0.2% |
| 14 | BA/HEA/MMA/IBA (55/15/10/20) | 99.1% | 1.7% | 1.5% | 99.3% | 1.4% | 1.3% | 99.7% | 0.4% | 0.0% |

*Measurements made 30 minutes, rather than 1 hour, after lamination

Example 15

Example 15 illustrates the use of a multifunctional acrylate crosslinking agent (1,6-hexanediol diacrylate (HDDA)) in the high transmittance, low haze acrylic latex pressure sensitive formulations of the present invention. The crosslinked adhesive composition was prepared by the semi-continuous emulsion polymerization method described in Example 1 using the monomer amounts shown Table 7 and tested for luminous transmittance, haze and opacity as described above. The results of these tests are reported in Table 4.

TABLE 4

| Ex. | Composition (wt Ratio) | Trans. (1 hr.) | Haze (1 hr.) | Opacity (1 hr.) | Trans. (3 hrs.) | Haze (3 hrs.) | Opacity (3 hrs.) |
|---|---|---|---|---|---|---|---|
| 15 | BA/HEA/MMA/HDDA (74/15/10/1) | 99.1% | 0.2% | 0.1% | 99.3% | 0.1% | 0.1% |

Comparative Examples C2–C4

Comparative Examples C2–C4 demonstrate the severe loss in optical properties of commercially available (meth) acrylic emulsion pressure sensitive adhesives when subjected to moisture and the wet lamination conditions described above. The results of these luminous transmittance, haze and opacity tests are reported in Table 5.

TABLE 5

| Ex. | Adhesive | Haze (1 hr.) | Opacity (1 hr.) | Haze (3 hrs.) | Opacity (24 hrs.) | Haze (24 hrs.) | Trans. (24 hrs.) |
|---|---|---|---|---|---|---|---|
| C2 | PS 83D[1] | 10.3% | 5.1% | 10.7% | 4.1% | 9.6% | 81.2% |
| C3 | UCAR 9655[2] | 15.1% | 5.9% | 14.8% | 4.1% | 9.7% | 86.4% |
| C4 | FLEX-CRYL 1625[3] | 11.7% | 13.8% | 17.5% | 14.1% | 32.8% | 69.9% |

[1]RHOBOND PS-83D, a 53% solids, low viscosity acrylic emulsion adhesive commercially available from Rohm & Haas Co., Springhouse, PA
[2]UCAR 9655, a 55% solids acrylic latex pressure sensitive adhesive, commercially available from Union Carbide Chemicals and Plastics Company Inc. Cary, NC
[3]FLEXCRYL 1625, a 69% solids water-based acrylic pressure-sensitive adhesive commercially available from Air Products and Chemicals, Inc., Allentown, PA Example 16

This example illustrates the use of buffer solution to adjust the pH of the latex. 38.40 grams of n-butyl acrylate (BA), 7.68 grams of 2-hydroxyethyl acrylate (HEA), 5.12 grams of methyl methacrylate (MMA), 374 grams of DI water and 0.5 gram of RHODACAL DS-10 (sodium dodecyl benzene sulfonate surfactant commercially available from Rhone-Poulenc) were added to a 2000 ml reactor. This mixture was stirred under nitrogen and degassed 4 times. The temperature was raised to 60° C. and 1.29 grams of potassium persulfate initiator was added. The reaction mixture was then heated to 70° C. and maintained at this temperature for 20 min. to complete the seed reaction. The reaction temperature was further increased to 80° C. At 80 ° C., a pre-emulsified monomer mixture was fed into the reactor for 2 hours. This pre-emulsified mixture contained 345.6 grams of BA, 69.12 grams of HEA, 46.08 grams of MMA, 0.8 gram of sodium hydrogen carbonate (Aldrich), 10.24 g of Uvinul 3050 (UV absorber, BASF), 208 grams of DI water and 5.29 grams of RHODACAL DS-10. After the feeding of the monomer mixture, the reaction was continued at 80 ° C. for another 60 min. After cooling down to room temperature, the reaction mixture was filtered through cheesecloth to yield an acrylic emulsion pressure sensitive adhesive of 48% solids, pH=5.1.

TABLE 6

| Ex. | Composition | Time | Haze |
|---|---|---|---|
| 17 | BA/MMA/HEA 75/10/15 | 30 mins. | 1.3% |
|  |  | 60 mins. | 0.8% |
|  |  | 120 mins. | 0.7% |

TABLE 7

| | | Example | | | | | | |
|---|---|---|---|---|---|---|---|---|
| | | 1 | 2 | 3 | 4 | 5 | 6 | C1 |
| Seed Monomer Mixture | BA | 43.52 g | 48.64 g | 40.96 g | 38.40 g | 48.64 g | 48.64 g | 51.20 |
| | HEA | 7.68 g | 2.56 g | 10.24 g | 12.80 g | 2.56 g | 2.56 g | 0 g |
| | DI Water | 300 g | 374 g | 374 g | 458 g | 324 g | 324 g | 300 g |
| | DS-10 | 0.50 g | 0.50 g | 0.50 g | 0.50 g | 0.50 g | 0.50 g | 0.50 g |
| 1st Initiator Charge | $K_2S_2O_8$ | 1.29 g | 1.29 g | 1.29 g | 1.29 g | 1.29 g | 1.29 g | 1.29 g |
| Monomer Pre-Emulsion | BA | 391.68 g | 412.16 g | 368.64 g | 345.60 g | 258.56 g | 207.36 g | 460.80 g |
| | HEA | 69.12 g | 48.64 g | 92.16 g | 115.20 g | 202.24 g | 253.44 g | 0 g |
| | DI Water | 167 g | 208 g | 208 g | 255 g | 526 g | 735 g | 167 g |
| | DS-10 | 5.29 g | 5.30 g | 5.29 g | 5.29 g | 5.30 g | 5.30 g | 5.29 g |
| 2nd Initiator Charge | $K_2S_2O_8$ | N/A | 0.32 g | N/A | N/A | N/A | N/A | N/A |

TABLE 7-continued

|  |  | Example | | | | |
| --- | --- | --- | --- | --- | --- | --- |
|  |  | 7 | 8 | 9 | 10 | 11 |
| Seed | BA | 48.64 g | 40.96 g | 40.96 g | 24.32 | 38.40 |
| Monomer | HEA | 0 g | 0 g | 0 g | 0 g | 7.68 g |
| Mixture | HEMA | 2.56 g | 10.24 g | 0 g | 2.56 | 0 g |
|  | HPA | 0 g | 0 g | 10.24 g | 0 g | 0 g |
|  | IOA | 0 g | 0 g | 0 g | 24.32 | 0 g |
|  | MMA | 0 g | 0 g | 0 g | 0 g | 5.12 g |
|  | AA | 0 g | 0 g | 0 g | 0 g | 1.54 g |
|  | DI Water | 374 g | 374 g | 458 g | 374 g | 374 g |
|  | DS-10 | 0.50 g | 0.50 g | 0.50 g | 0.50 g | 0.50 g |
| 1$^{st}$ Initiator Charge | $K_2S_2O_8$ | 1.29 g | 1.29 g | 1.29 g | 1.29 g | 1.29 g |
| Monomer | BA | 412.16 g | 368.64 g | 368.64 g | 180.48 g | 345.60 g |
| Pre- | HEA | 0 g | 0 g | 0 g | 0 g | 69.12 g |
| Emulsion | HEMA | 48.64 g | 92.16 g | 0 g | 99.84 g | 0 g |
|  | HPA | 0 g | 0 g | 92.16 g | 0 g | 0 g |
|  | IOA | 0 g | 0 g | 0 g | 180.48 g | 0 g |
|  | MMA | 0 g | 0 g | 0 g | 0 g | 46.08 g |
|  | AA | 0 g | 0 g | 0 g | 0 g | 13.82 g |
|  | DI Water | 208 g | 208 g | 255 g | 208 g | 208 g |
|  | DS-10 | 5.30 g | 5.30 g | 5.30 g | 5.30 g | 5.30 g |
| 2$^{nd}$ Initiator Charge | $K_2S_2O_8$ | N/A | N/A | N/A | N/A | N/A |

|  |  | Example | | | | |
| --- | --- | --- | --- | --- | --- | --- |
|  |  | 12 | 13 | 14 | 15 | 16* |
| Seed | BA | 38.40 | 33.28 g | 28.16 g | 38.4 | 38.40 |
| Monomer | HEA | 7.68 g | 7.68 g | 7.68 g | 7.68 g | 7.68 g |
| Mixture | HDDA | 0 g | 0 g | 0 g | 0.52 | 0 g |
|  | $NaHCO_3$ | 0 g | 0 g | 0 g | 0 g | 0 g |
|  | IBA | 0 g | 5.12 g | 10.24 g | 0 g | 0 g |
|  | MMA | 2.56 g | 5.12 g | 0 g | 5.12 g | 5.12 g |
|  | AA | 2.56 g | 0 g | 0 g | 0 g | 0 g |
|  | DI Water | 374 g | 374 g | 374 g | 374 g | 374 g |
|  | DS-10 | 0.50 g | 0.50 g | 0.50 g | 0.50 g | 0.50 g |
| 1$^{st}$ Initiator Charge | $K_2S_2O_8$ | 1.29 g | 1.29 g | 1.29 g | 1.29 g | 1.29 g |
| Monomer | BA | 345.60 g | 299.52 g | 253.44 g | 345.60 g | 345.60 g |
| Pre- | HEA | 69.12 g | 69.12 g | 69.12 g | 69.12 g | 69.12 g |
| Emulsoin | HDDA | 0 g | 0 g | 0 g | 4.60 g | 0 g |
|  | $NaHCO_3$ | 0 g | 0 g | 0 g | 0 g | 0.8 g |
|  | IBA | 0 g | 46.08 g | 92.16 g | 0 g | 0 g |
|  | MMA | 23.04 g | 46.08 g | 46.08 g | 46.08 g | 46.08 g |
|  | AA | 23.04 g | 0 g | 0 g | 0 g | 0 g |
|  | DI Water | 208 g | 208 g | 208 g | 208 g | 208 g |
|  | DS-10 | 5.30 g | 5.30 g | 5.30 g | 5.30 g | 5.30 g |
| 2$^{nd}$ Initiator Charge | $K_2S_2O_8$ | N/A | N/A | N/A | N/A | N/A |

*Uvinul 3050 (10.24 g) was added into the monomer pre-emulsion mixture as a UV stabilizer.

Various modifications and alterations of this invention will become apparent to those skilled in the art without departing from the scope and principles of this invention, and it should be understood that this invention is not to be unduly limited to the illustrative embodiments set forth hereinabove. All publications and patents are incorporated herein by reference to the same extent as if each individual publication or patent was specifically and individually indicated to be incorporated by reference.

What is claimed:

1. A water-resistant emulsion polymeric pressure sensitive adhesive comprising (a) 50–90% by weight n-butyl acrylate, (b) 10–50% by weight 2-hydroxy ethyl acrylate, or 2-hydroxy ethyl methacrylate, or hydroxy propyl acrylate monomer, or mixtures thereof, wherein the water-resistant emulsion pressure sensitive adhesive exhibits less than 2% increase in haze, less than 2% increase in opacity and greater than approximately 95% transmittance in the visible spectrum ranging from 380 to 720 nm after wet lamination process.

2. The water-resistant emulsion polymeric pressure sensitive adhesive according to claim 1 further comprising co-polymerizable monomers.

3. The water-resistant emulsion polymeric pressure sensitive adhesive according to claim 2 wherein the co-polymerizable monomers are (i) 0–50% by weight alkylacrylate monomer, (ii) 0–5% by weight polar monomers, (iii) 0–50% by weight ethylenically unsaturated free radically polymerizable monomers or (iv) mixtures thereof.

4. The water-resistant emulsion polymeric pressure sensitive adhesive according to claim 3 wherein the alkylacrylate monomers are methyl methacrylate, isobornyl acrylate, ethyl acrylate, methyl acrylate, isooctylacrylate, 2-ethyl hexyl acrylate and mixtures thereof and are used in the range of 0–30% by weight.

5. The water-resistant emulsion polymeric pressure sensitive adhesive according to claim 3 wherein the polar monomers are acrylic acid, methacrylic acid, itaconic acid, N-vinyl pyrrolidone, N-vinyl caprolactam, (meth) acrylamides, dimethylaminoethyl methacrylate, acrylonitrile, 2-carboxyethyl acrylate, maleic anhydride, and mixtures thereof.

6. The water-resistant emulsion polymeric pressure sensitive adhesive according to claim 3 wherein the ethylenically unsaturated free radically polymerizable monomers are styrene and $C_1$–$C_4$ vinyl esters and mixtures thereof and are present in the range of 0–30% by weight.

7. The water-resistant emulsion polymeric pressure sensitive adhesive according to claim 1 further comprising a multifunctional cross-linking agent.

8. The water-resistant emulsion polymeric pressure sensitive adhesive according to claim 7 wherein the multifunctional crosslinking agent is copolymerizable with the monomeric components of the emulsion mixture or is a post-additive crosslinking agent.

9. The water-resistant emulsion polymeric pressure sensitive adhesive according to claim 8 wherein the copolymerizable crosslinking agents are selected from the group consisting of divinylbenzene, alkyl diacrylates, alkyl triacrylates, alkyl tetracrylates, and monoethylenically unsaturated aromatic ketones.

10. The water-resistant emulsion polymeric pressure sensitive adhesive according to claim 8 wherein the post-additive crosslinking agents are multifunctional aziridine amides or metal ion crosslinkers.

11. The water-resistant emulsion polymeric pressure sensitive adhesive according to claim 1, having a pH of about 1 to about 7.

* * * * *